May 15, 1934.  W. OWEN  1,959,216
UNIVERSAL VACUUM FRAME
Filed Aug. 5, 1933   4 Sheets-Sheet 1

INVENTOR
WILLIAM OWEN
BY Bradley + Bee
ATTORNEYS.

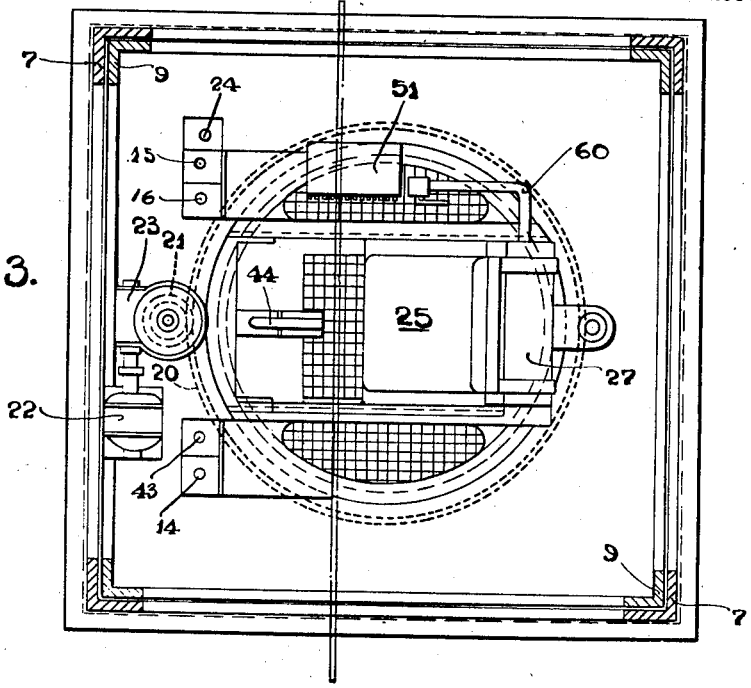
Fig. 3.
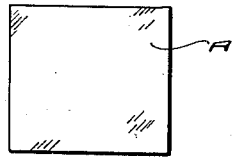
Fig. 5.
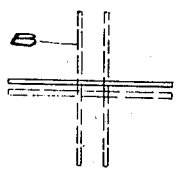
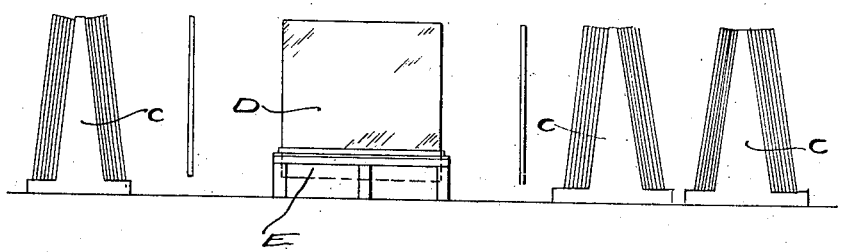

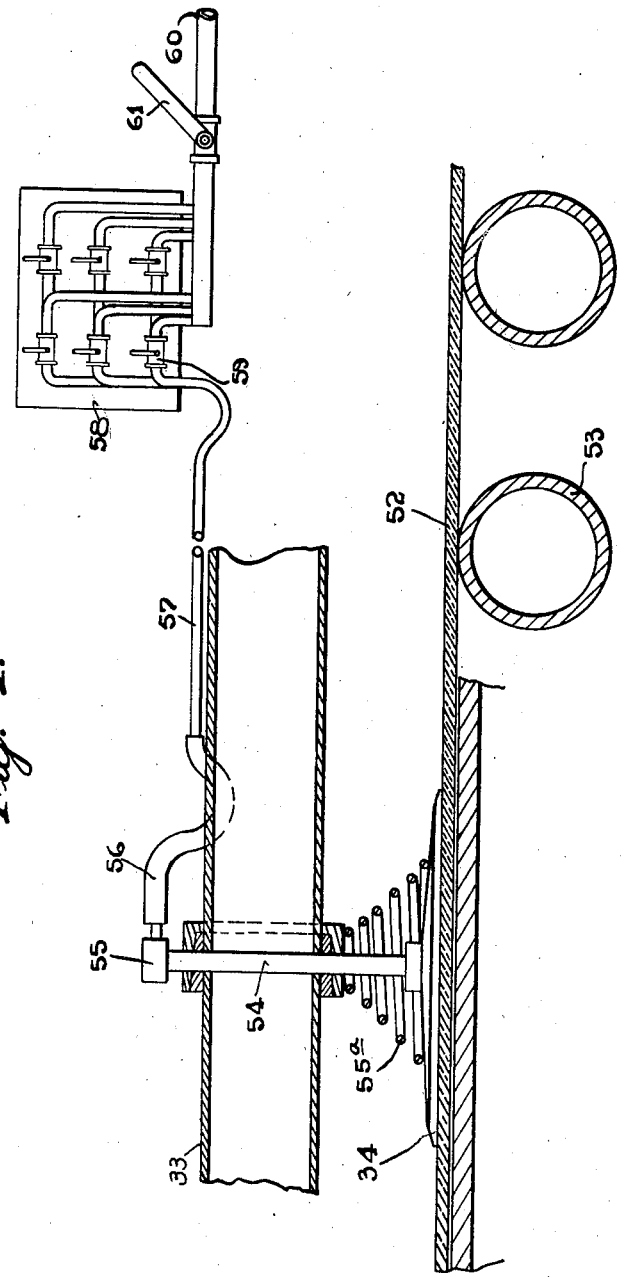

Patented May 15, 1934

1,959,216

UNITED STATES PATENT OFFICE 1,959,216

UNIVERSAL VACUUM FRAME

William Owen, Pittsburgh, Pa., assignor to Pittsburgh Plate Glass Company, a corporation of Pennsylvania Application August 5, 1933, Serial No. 683,875

4 Claims. (Cl. 212—11)

Figure 1:
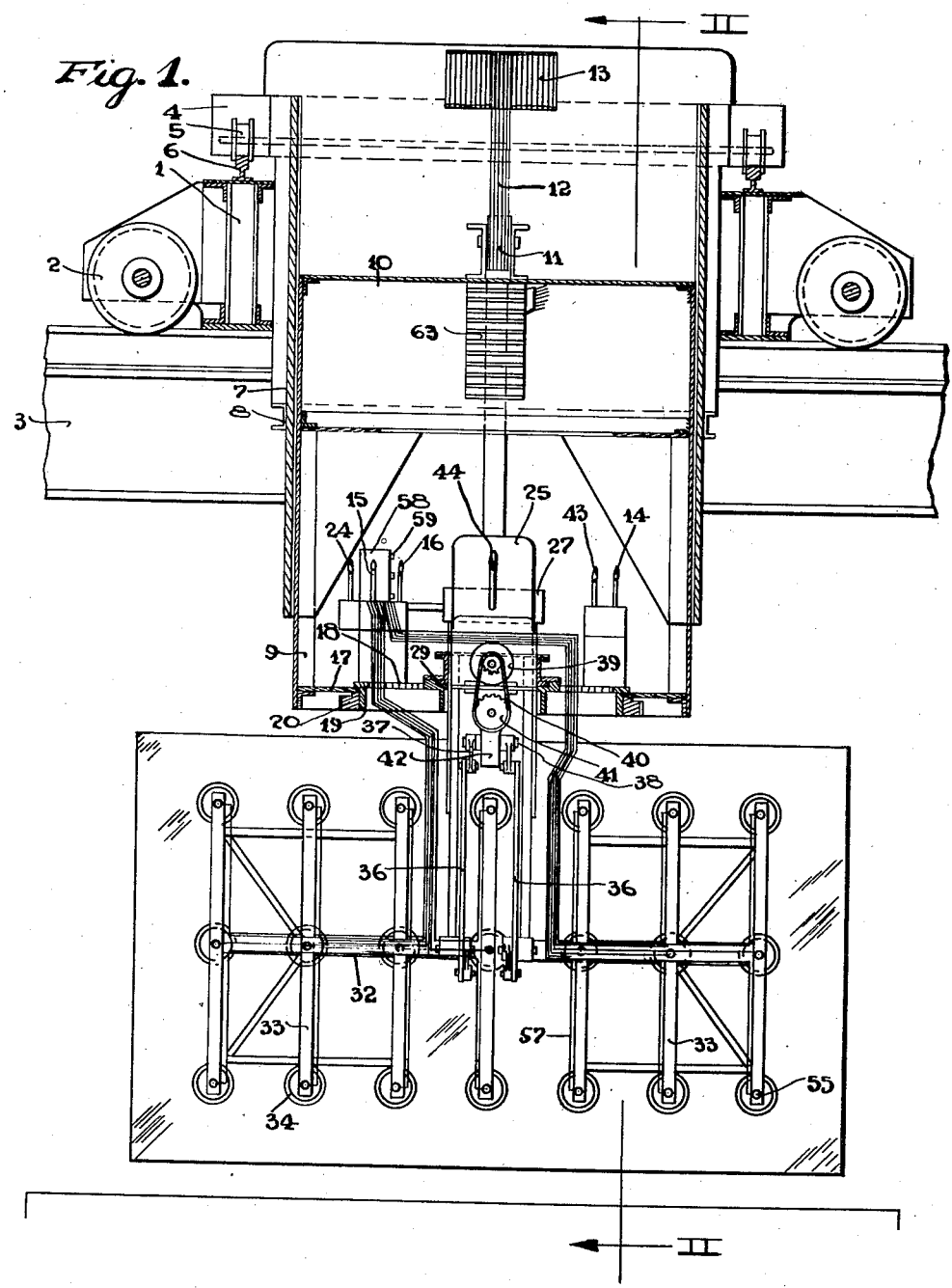
Figure 2:
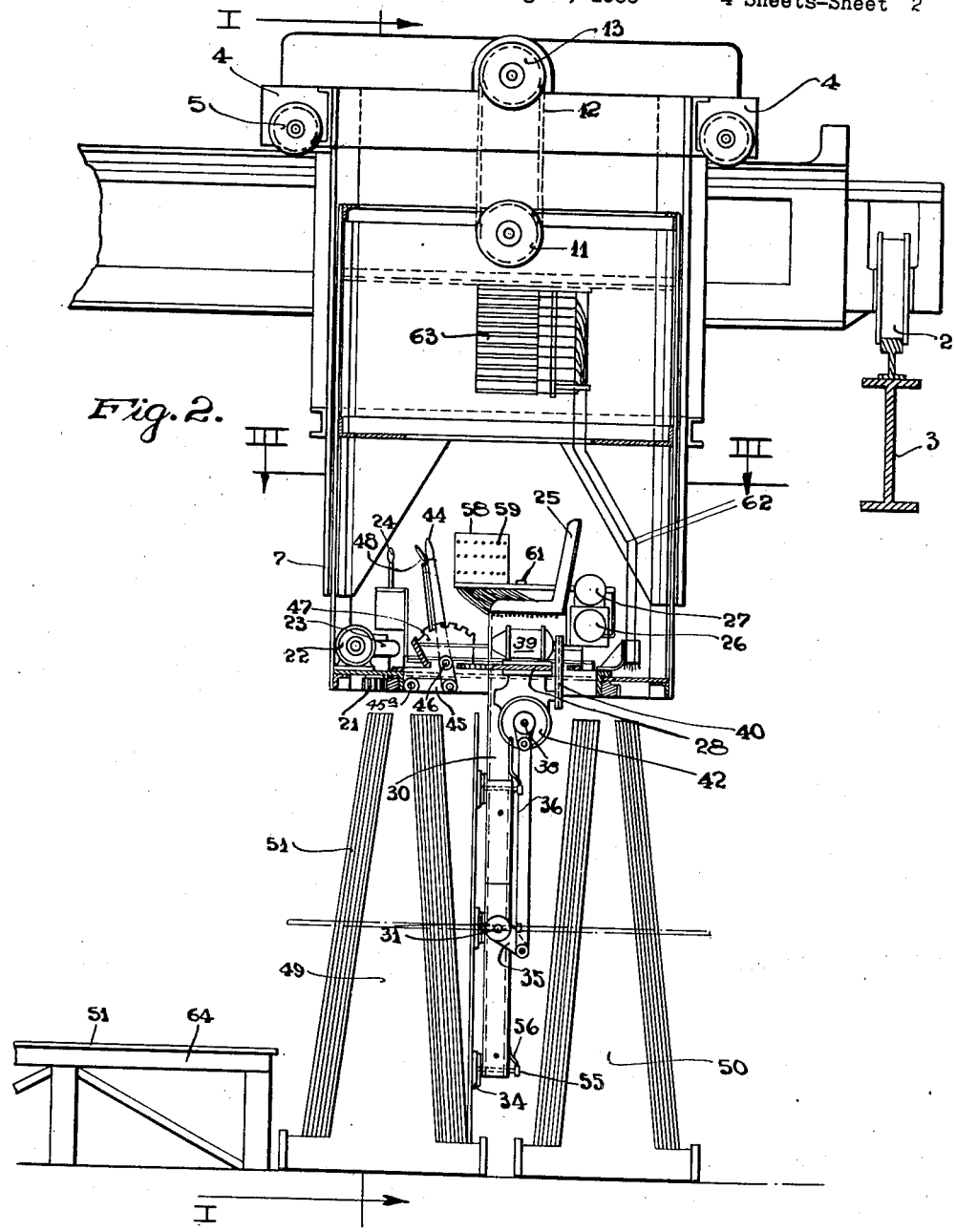

The invention relates to a vacuum frame for handling of sheets. It is designed primarily for handling sheets of plate glass, but may be used for handling large sheets of materials other than glass. The invention has for its principal objects the provision of an improved construction which permits the handling of the sheets by a single operator located on a turntable on the crane above the vacuum frame. Heretofore, in order to do the work accomplished by the present apparatus, it has been necessary to have one or more floor workers, in addition to the crane man located in the cage of the crane which carries the vacuum frame. The use of these floor workers involves additional expense, and they are subject to some hazard which is avoided in the use of the present improved apparatus. As applied to the handling of glass plates, the apparatus is capable of performing all the shifting work which arises in connection with such material, such as removing the plates from cutting tables and placing them in racks or vice versa, transferring them from one rack to another, or in handling the plates in connection with the grinding and polishing operations. The apparatus involves the use of a turntable on the crane, and an operator's station or carriage, movable vertically with respect to the crane body and transversely of the turntable with a vacuum frame carried by the station axially of the turntable and tiltable about a horizontal axis. This makes it possible for the operator on the station or carriage to adjust the vacuum frame in all possible required positions; as it may be moved up and down, swung about a vertical axis, moved transversely of the turntable and tilted about a horizontal axis. The turntable is preferably arranged to move up and down with the operator's station or carriage, but will function to the same effect if fixed against vertical movement, provided the operator's platform which is carried by the turntable is movable vertically. One embodiment of the invention is shown in the accompanying drawings, wherein:
Figure 1 is a vertical section on the line I—I of Fig. 2. Fig. 2 is a vertical section on the line II—II of Fig. 1. Fig. 3 is a horizontal section on the line III—III of Fig. 2. Fig. 4 is a diagrammatic view, partially in section, showing the vacuum frame connections and controlling valves. And Fig. 5 is a diagrammatic view showing the various positions in which it is possible to shift glass sheets by the use of the apparatus.

Referring to the drawings, 1 is a crane body of ordinary construction provided with wheels 2 and mounted on an overhead track 3. Carried on a frame body 1 is a second frame 4 mounted on wheels 5, which run on the track 6. This provides a means whereby the apparatus may be shifted to any desired position over the floor of the plant. The frame 4 carries a depending guide frame in the form of four angles 7 (Fig. 3) tied together at their lower ends by the channel 8. Mounted for vertical movement in the guide 7 is a frame which carries at its lower end a turntable and the operator's station or platform, later described. This frame is made up of four angle irons 9 which fit into the angle iron 7 and are connected at their upper ends by transverse members 10. This vertically movable frame is provided with a sheave 11 around which passes the cable 12, such cable also passing around a drum 13 carried by the frame 4. The drum 13 is driven by a motor (not shown) and controlled from the operator's cage by the controller handle 14. The handles 15, 16 operate controllers which govern the movement of the crane horizontally on the tracks 3 and 6.

The vertically movable frame is provided with a floor 17 and on this is mounted a turntable 18. This turntable has a depending flange 19 which carries a rack 20 and this rack is engaged by a pinion 21 (Fig. 2) driven from the motor 22 through the intermediary of suitable reduction gearing in the casing 23. The operation of this motor is governed by the controller handle 24. Mounted on the turntable is the operator's seat 25. Back of this seat is located a vacuum pump and motor 26, and the vacuum tank 27, by means of which the necessary vacuum is secured for operating the cups of the vacuum frame.

The platform 28 which carries the seat 25 is mounted for sliding movement transversely of the turntable, as indicated in Fig. 1, such platform being guided in its horizontal movement by the guides 29. Depending from the platform 28 is a vacuum frame support 30 whose lower end acts as a support for the axle 31 on which the vacuum frame is mounted for tilting movement. The vacuum frame comprises the transverse central member 32 and the arms 33, each of which carries a vacuum cup 34. The axle 31, which carries the vacuum frame, is provided with a pair of crank arms 35 for tilting the frames, such arms being connected by means of the rods 36 with the crank arms 37 on the shaft 38. This shaft 38 is driven from the motor 39 carried by the platform 18 through the intermediary of the sprocket chain 40, the sprocket wheel 41, and suitable reduction gearing in the casing 42. This provides a means for tilting the vacuum frame at any desired angle from a vertical position to a horizontal position, the control being accomplished by means of the controller handle 43. The platform 28 is movable transversely of the turntable by means of the shift lever 44 carrying a link 45 pivoted at 45ª to the turntable and pivoted at 46 to the platform, the quadrant 47 and holding pawl 48 being provided for fixing the shift lever in any desired position. This shifting or movement of the platform comes into play in giving the vacuum frame its final movement toward a glass plate in order to attach the vacuum cups thereto. An instance in which this movement is required will be clear in connection with Fig. 2, in which the vacuum frame is positioned between two racks 49 and 50 carrying the glass sheets 51.

After the vacuum frame is positioned between the racks and tilted slightly from the vertical by the motor 39, the shift lever 44 is moved so as to shift the platform 28 to the left sufficiently to cause the vacuum cups to engage a sheet of glass on the rack 49, after which the platform is moved back to central position, as indicated in Fig. 2, and the crane is moved to transport the sheet to its new location.

The construction of the vacuum frame and the control connections will be seen by reference to Fig. 4, which illustrates the frame in horizontal position engaged in the operation of removing a glass sheet 52 from the rolls 53 of the conveyor. The arms 33 are preferably in the form of chambers and the cups 34 are mounted on hollow bars 54 which extend slidably through the chambers 33. The cups are yieldingly pressed forward by means of springs 55ª. The hollow bars constitute vacuum connections provided with heads 55, to which the rubber hoses 56 are attached, thus permitting the back and forth movement of the bars 54. The other ends of the hoses 56 are connected to metal pipes 57 which lead to the control board 58. This control board carries the valves 59, which permits the cutting off of the supply of vacuum to any desired cup or set of cups. This permits the use of the vacuum frame with plates of varying size, the operation of those cups which do not engage the glass being cut off by the valve 59 at the control board. The various vacuum pipes are all connected to a single supply pipe 60 provided with a valve having a handle 61. This supply pipe is connected to the vacuum tank 27 located behind the operator's seat. The current required for operating the various members carried by the crane is supplied through the leads 62 connected to the collector rings 63.

The use of the apparatus permits the shifting of glass plates from a plurality of different positions, as indicated diagrammatically in Fig. 5. The glass may be picked up from a flat horizontal position, as indicated at A, and shifted to a vertical position, as indicated at B, and in such vertical position may be turned on a vertical axis by the use of the turntable, also as indicated at B. When in vertical position, the plates may be applied to the racks C, C, C by tilting the vacuum frame by the links 36, and then moving the platform 28 laterally by means of the shifting lever 44. The plates may be similarly removed from the racks by a reverse operation of the vacuum frame. D shows a plate which has been lifted from a horizontal position on a roller conveyor E, such as that of Fig. 4. In this manner, all the shifting operations required in connection with glass plates may be accomplished by the operator on the platform 28 without the assistance of floor men. In Fig. 2, a cutting table 64 is shown, to and from which the glass plates 51 may be shifted, as heretofore described. The advantage of the apparatus will be readily apparent to those skilled in the art.

What I claim is:

1. In combination with an overhead crane mounted for horizontal movement, a turntable on the crane mounted for movement about a vertical axis, a vertically movable operator's carriage supported on the turntable for movement transversely thereof, a vacuum frame support depending from the carriage, a vacuum frame pivoted on a horizontal axis on said support, and operating means controlled from said carriage for rotating the turntable, moving the carriage transversely of such turntable, and tilting the vacuum frame about its horizontal axis.

2. In combination with an overhead crane mounted for horizontal movement, a turntable on the crane mounted for movement about a vertical axis, a vertically movable operator's carriage supported on the turntable for movement transversely thereof, a vacuum frame support depending from the carriage, and arranged substantially axially with respect to the turntable, a vacuum frame pivoted on a horizontal axis on said support, and operating means controlled from said carriage for rotating the turntable, moving the carriage transversely of such turntable and tilting the vacuum frame about its horizontal axis.

3. In combination with an overhead crane mounted for horizontal movement, a turntable on the crane mounted for vertical movement and for movement about a vertical axis, an operator's carriage mounted on the turntable for movement transversely thereof, a vacuum frame support depending from the carriage, a vacuum frame pivoted on a horizontal axis on said support, and operating means controlled from said carriage for rotating the turntable, moving the carriage transversely of such turntable, and tilting the vacuum frame about its horizontal axis.

4. In combination with an overhead crane mounted for horizontal movement, a turntable on the crane mounted for vertical movement and for movement about a vertical axis, an operator's carriage mounted on the turntable for movement transversely thereof, a vacuum frame support depending from the carriage, and arranged substantially axially with respect to the turntable, a vacuum frame pivoted on a horizontal axis on said support, and operating means controlled from said carriage for rotating the turntable, moving the carriage transversely of such turntable, and tilting the vacuum frame about its horizontal axis.

WILLIAM OWEN.